Sept. 7, 1943.  M. A. ARNDT  2,328,768
ANGLE MEASURING CALIPER
Filed Dec. 22, 1941
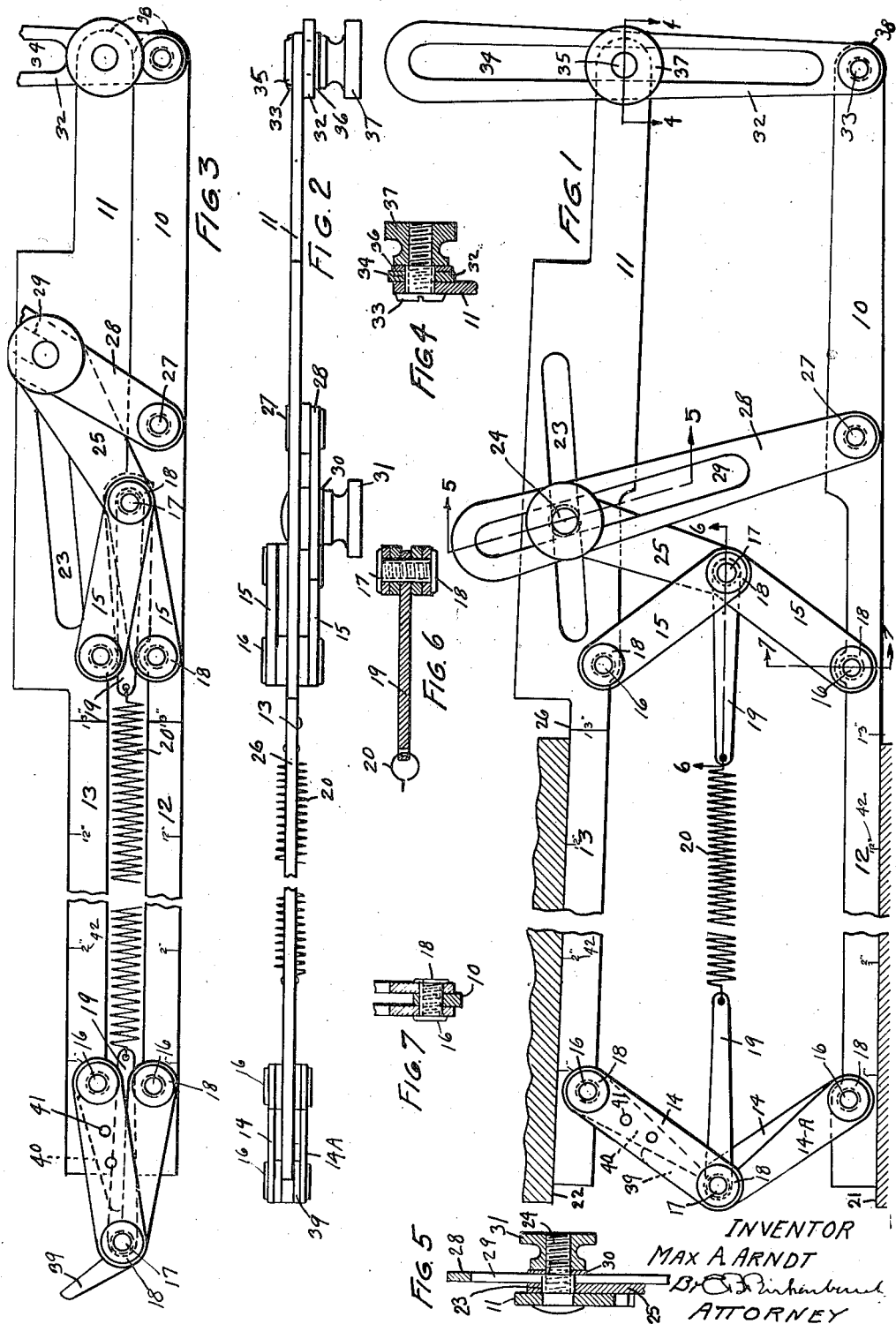
INVENTOR
MAX A ARNDT
ATTORNEY Patented Sept. 7, 1943

2,328,768

UNITED STATES PATENT OFFICE 2,328,768

ANGLE-MEASURING CALIPER

Max A. Arndt, Portland, Oreg.

Application December 22, 1941, Serial No. 423,943

3 Claims. (Cl. 33—98)

This invention relates generally to measuring devices and particularly to an angle measuring caliper.

The main object of this invention is to construct a caliper whereby the relative angularity and space between the adjacent sides of two objects may be quickly and accurately determined and transferred.

The second object is to reduce the amount of time required for filling in spaces between adjacent faces of machine parts and supports which may be rough or inaccurately finished.

The third object is to construct a device of the class described in which not only the angularity of the space is determined, but the extent or length of the measurement is also determined in order that a proper chock may be prepared as a filler for the space.

The fourth object is to construct a device of the class described in which the utmost precision may be obtained in determining the spacing and angularity of two faces and in which extreme precision in the manufacture of the parts of the device is not essential.

These and other objects are accomplished in the manner set forth in the following specification as illustrated in the accompanying drawing, in which:

Fig. 1 is a side elevation of the device showing same in use.

Fig. 2 is a plan of Fig. 1.

Fig. 3 is a side elevation of the device showing same in a collapsed form.

Fig. 4 is a fragmentary section taken along the lines 4—4 in Fig. 1.

Fig. 5 is a section taken along the line 5—5 in Fig. 1.

Fig. 6 is a section taken along the line 6—6 in Fig. 1.

Fig. 7 is a section taken along the line 7—7 of Fig. 1.

Similar numbers refer to similar parts throughout the several views.

Referring in detail to the drawing, there is shown a pair of elongated arms 10 and 11 between whose ends 12 and 13 are mounted the toggle links 14 and 15. The links 14 and 15 are attached to the ends 12 and 13 by means of the pivot screws 16, and to each other by means of the screws 17.

The screws 16 and 17 are each provided with a tubular nut 18. Attached to the screws 17 between the links 14 and 15 are the spring fastening links 19 between which is disposed the tension spring 20, the purpose of which is to act on the toggle links 14 and 15 to urge the members 10 and 11 apart so they will be in full contact with the faces 21 and 22, the relative spacing and angularity of which it is sought to determine.

The arm 11 is provided with an elongated slot 23 through which extends the screw 24 which also passes through the extension 25 formed on one of the links 15. The slot 23 is inclined somewhat with relation to the face 26 of the end 13.

Attached to the arm 10 by means of a screw 27 is a slotted arm 28 whose slot 29 also receives the screw 24.

A clamping washer 30 is placed against the slotted arm 28 and is held by means of the knurled clamping nut 31 on the screw 24. It can be seen by this construction that the nut 31 can clamp the members 28, 25 and 11 in rigid relationship, and aside from the clearance around the parts 16, 17 and 27, fix relationship between the members 10 and 11.

To prevent any error arising from the clearance between these parts which is necessary to operation, or which may occur in manufacture, or which may develop in use, I have provided the slotted locking arm 32 which is attached to the arm 10, by means of the screw 33 and which is provided with a slot 34 through which extends the screw 35 which also passes through the end of the member 11.

A washer 36 is placed on the screw 35 against the arm 32, and a knurled nut 37 on the screw 35 makes it possible to fix the ends 38 of the members 10 and 11 with relation to each other.

It will be noted that the link 14—A has formed thereon an extension 39 which engages the stop 40 which is in turn secured by the rivets 41 to the adjacent link 14. The purpose of the arm 39 is to limit the movement of the toggle links 14 and 15 and hold same in a collapsible position.

It is also desirable to provide calibrations 42 along the ends 12 and 13 in order to indicate the length of the taper or space being measured.

The operation of the device is as follows:

When desiring to fill the relative space between two surfaces 21 and 22, the operator merely inserts the device in collapsed form as shown in Fig. 3 and permits the members 10 and 11 to operate under the action of the spring 20, at the same time moving it into position longitudinally as far as desired. The knurled nuts 31 and 37 are then tightened and the device withdrawn after noting the readings at the edges 43 which indicate the length of the measurement from the ends 44.

It can be seen that various forms of this device may be constructed without departing from the spirit of the invention. For example, the member 32 may be entirely eliminated, but this would detract from the accuracy of the device and seriously impair its value.

I am aware that numerous forms of devices have been constructed in the past and used to accomplish the same or similar purpose. It is therefore not my intention to cover such devices broadly, but I do intend to cover all such forms and modifications thereof as fall fairly within the appended claims.

I claim:

1. A device of the class described consisting of a pair of elongated arms having two sets of opposed toggle joints disposed between one pair of arm ends and spaced adjustable braces disposed between the opposite pair of arm ends, and spring means between said toggle joints for urging said arms apart.

2. In a device of the class described, the combination of a pair of elongated arms, one of said arms having a slot formed therein toward one end thereof, the opposite ends of said arms constituting work engaging members, a pair of opposed toggle joints between said arms including springs for urging same toward a straight line position, the joints in said toggles being midway between said arms, one link of said toggle extending beyond its intermediate joint to the slot in the opposite arm, a slotted brace link having a clamping bolt extending through the slot in said brace link, through the extension on said toggle and through the slot on said arm, one end of said brace link being hinged to the unslotted arm, said slotted arm together with the extended toggle link and a portion of the unslotted arm constituting a rigid triangular frame, and a second slotted brace link disposed across the ends of said arm remote from their work engaging ends, and a clamping bolt passing through the slot in said second link into one of said arms while the opposite end of said second link is hinged to the remaining arm.

3. In a device of the class described, the combination of a pair of elongated arms, opposed toggle joints between said arms near one end thereof characterized by having a limit stop on one of said joints, a spring for urging said toggle joints together in a manner to move said arms apart, and spaced clamps between said arms adapted to releasably hold said arms in a fixed relationship.

MAX A. ARNDT.